United States Patent
Tsirkin (10) Patent No.: US 10,430,221 B2
(45) Date of Patent: Oct. 1, 2019

(54) POST-COPY VIRTUAL MACHINE MIGRATION WITH ASSIGNED DEVICES

(71) Applicant: Red Hat Israel, Ltd., Ra'anana (IL)

(72) Inventor: Michael Tsirkin, Yokneam Illit (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 135 days.

(21) Appl. No.: 14/867,176

(22) Filed: Sep. 28, 2015

(65) Prior Publication Data

US 2017/0090964 A1    Mar. 30, 2017

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 7,383,405 B2 | 6/2008 | Vega et al. | |
| 7,788,665 B2 | 8/2010 | Oshins | |
| 8,086,821 B2 | 12/2011 | Mukherjee et al. | |
| 8,146,082 B2 | 3/2012 | Belay | |
| 8,239,609 B2 * | 8/2012 | Hudzia | G06F 9/45533 709/230 |
| 8,671,256 B2 * | 3/2014 | Dow | G06F 12/08 711/162 |
| 8,924,965 B2 | 12/2014 | Tsirkin et al. | |
| 2009/0007099 A1 | 1/2009 | Cummings et al. | |
| 2012/0167082 A1 | 6/2012 | Kumar et al. | |
| 2012/0179855 A1 | 7/2012 | Tsirkin et al. | |
| 2013/0305246 A1 | 11/2013 | Goggin et al. | |
| 2014/0052948 A1 * | 2/2014 | Qiu | G06F 9/485 711/162 |
| 2016/0139962 A1 * | 5/2016 | Tsirkin | G06F 9/5088 718/1 |

OTHER PUBLICATIONS

Rizzo et al., Speeding Up Packet I/O in Virtual Machines, 2013, obtained from http://www.computer.org/csdl/proceedings/ancs/2013/9999/00/06665175.pdf (12 pages).

Gordon et al., "Towards Exitless and Efficient Paravirtual I/O", Jun. 6, 2012, obtained from http://www.mulix.org/pubs/eli/elvis-systor12.pdf (6 pages).

* cited by examiner

*Primary Examiner* — Gregory A Kessler
(74) *Attorney, Agent, or Firm* — K&L Gates LLP (57) ABSTRACT

A hypervisor updates a mapping at a first time by storing a first mapping of the first plurality of pages in an input-output memory management unit. A guest of a virtual machine attempts to access at least one byte of each of a second plurality of pages on the migration destination, which are absent from the migration destination, such that a plurality of page faults are generated responsive to the guest access attempt. The hypervisor detects the plurality of page faults, copies the second plurality of pages of the guest of the virtual machine, from the migration source to the migration destination, and stores a second mapping of the second plurality of pages in the input-output memory management unit and a device receives access to the second plurality of pages.

20 Claims, 6 Drawing Sheets

POST-COPY VIRTUAL MACHINE MIGRATION WITH ASSIGNED DEVICES

BACKGROUND

The present disclosure relates generally to memory management of virtual machines, and more particularly to post-copy virtual machine migration with assigned devices. Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. The present disclosure provides improved systems and methods for managing memory in a virtual environment.

SUMMARY

The present disclosure provides new and innovative methods and system for post-copy virtual machine migration. For example, the method includes updating, by a hypervisor, a mapping at a first time that includes storing a first mapping of the first plurality of pages of a guest of a virtual machine, which is being migrated from a migration source to a migration destination, in an input-output memory management unit and a device receiving access to the first plurality of pages associated with the first mapping. The hypervisor detects a plurality of page faults and copies the second plurality of pages of the guest of the virtual machine, from the migration source to the migration destination. Then the hypervisor stores a second mapping of the second plurality of pages in the input-output memory management unit and the device receives access to the second plurality of pages associated with the second mapping.

Additional features and advantages of the disclosed method and apparatus are described in, and will be apparent from, the following Detailed Description and the Figures.

DETAILED DESCRIPTION OF EXAMPLE EMBODIMENTS

Figure 1:
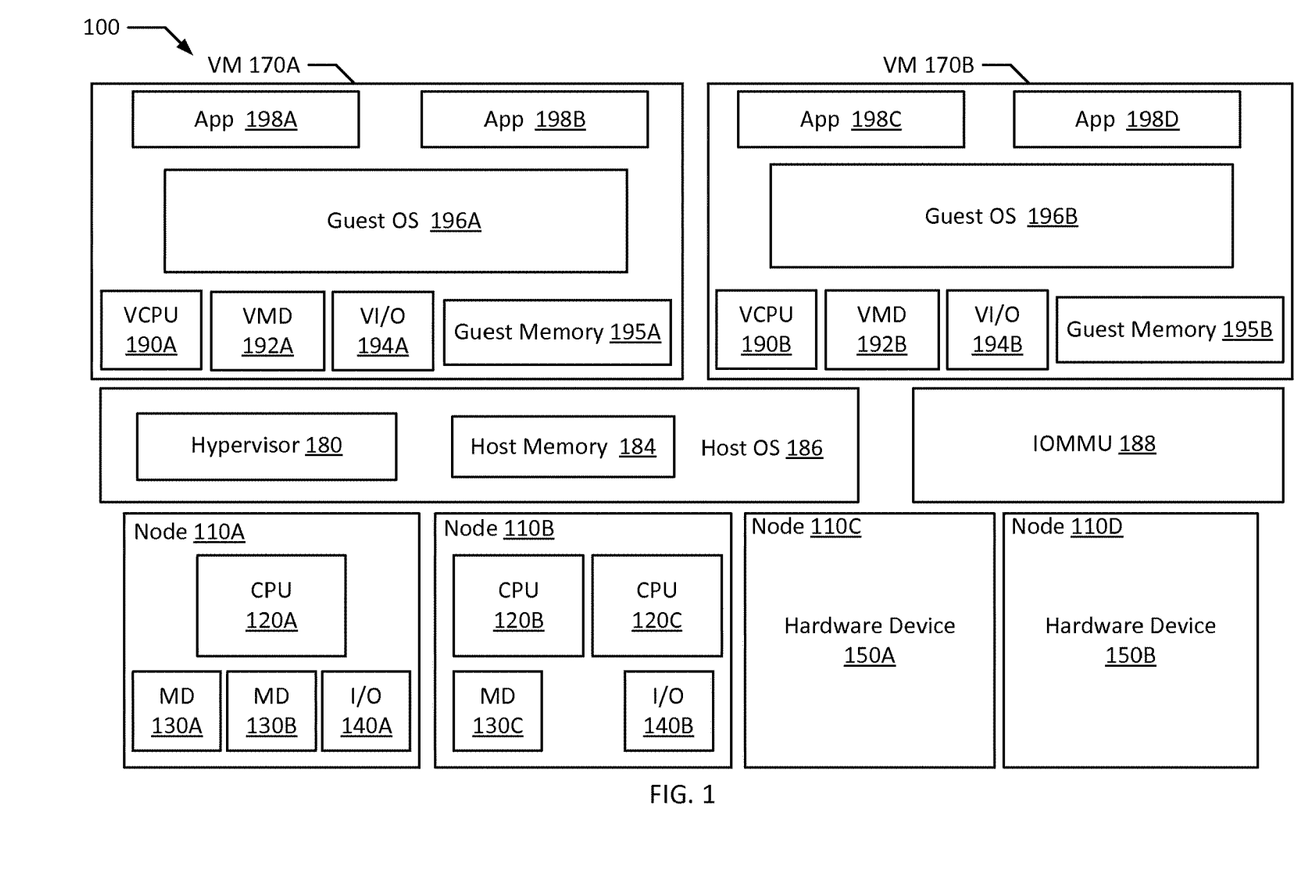
FIG. 1 is a block diagram of an example multiprocessor computer system according to an example embodiment of the present disclosure.

FIG. 1 depicts a high-level component diagram of an example multiprocessor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-C, I/O 140A-B, a software device, and/or hardware device 150A-B.

As noted above, computer system 100 may run multiple virtual machines (e.g., VM 170A-B), by executing a software layer (e.g., hypervisor 180) above the hardware and below the virtual machines 170A-B, as schematically shown in FIG. 1. In an example embodiment, the hypervisor 180 may be a component of the host operating system 186 executed by the computer system 100. In another example embodiment, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to virtual machines 170A-B as devices, including virtual processors (e.g., VCPU 190A-B), virtual memory devices (e.g., VMD 192A-B), and/or virtual I/O devices (e.g., VI/O 194A-B).

In an example embodiment, a virtual machine 170A-B may execute a guest operating system 196A-B which may utilize the underlying VCPU 190A-B, VMD 192A-B, and VI/O devices 194A-B. One or more applications 198A-D may be running on a virtual machine 170A-B under the guest operating system 196A-B. In an example embodiment, a virtual machine 170A-B may include multiple virtual processors (VCPU) 190A-B. Processor virtualization may be implemented by the hypervisor 180 scheduling time slots on one or more physical processors 120A-C such that from the guest operating system's perspective those time slots are scheduled on a virtual processor 190A-B.

The hypervisor 180 manages host memory 184 for the host operating system 186 as well as memory allocated to the virtual machines 170A-B and guest operating systems 196A-B such as guest memory 195A-B provided to guest OS 196A-B. Host memory 184 and guest memory 195A-B may be divided into a plurality of memory pages that are managed by the hypervisor 180. Guest memory 195A-B allocated to the guest OS 196A-B are mapped from host memory 184 such that when a guest application 198A-D uses or accesses a memory page of guest memory 195A-B it is actually using or accessing host memory 184.

The hypervisor 180 may keep track of how each memory page is mapped, allocated, and/or used through the use of the input-output memory management unit (IOMMU) 188. The IOMMU 188 maps the device address space (e.g., a bus address) that is relevant to the I/O bus into the physical address space (e.g., a host physical address) or the virtual address space (e.g., a host virtual address). The IOMMU 188 may also include extra information associated with the address space mapping, such as read and write permissions. Mappings in the IOMMU 188 exist to allow a device to access the address. Mappings can be removed to prevent direct access to the address. The mechanism of mapping and unmapping an address allows a host, through a hypervisor 180, to control access to a particular host address. As a result, the host can maintain memory integrity by preventing a device from performing illegal transactions or accessing invalid addresses.

In this manner, the hypervisor 180, through the IOMMU 188, can prevent memory allocated to one guest OS 196A from being inappropriately accessed and/or modified by another guest OS 196B or the host OS 186. Accesses are detected by the guest OS (e.g., 196A) in the virtual machine (e.g., VM 170A), which may act as an interface between a host OS (e.g., 186) and the guest OS (e.g., 196A). Similarly, the hypervisor 180, through the IOMMU 188, can prevent memory assigned to or being used by one application 198A from being used by another application 198B. Additionally, the hypervisor 180, through the IOMMU 188, can prevent memory accessible by one node (e.g., 110A) from being used by another node (e.g., 110B). In an example embodiment, the IOMMU 188 is a separate component from the VMs 170A-B, nodes 110A-D, the host OS 186, and the hypervisor 180. In a different example embodiment, the IOMMU 188 is emulated, such that it is included within the host OS 186, and used by the guest OS 196A-B to communicate with the hypervisor 180.

The mapping process for memory, by the hypervisor 180 through the IOMMU 188, is described in greater detail with reference to FIGS. 4 and 5. Mappings to memory, stored in the IOMMU 188, are accessible by the hypervisor 180, the VMs 170A-B and each node 110A-D. Through these mappings, the memory itself can be accessed. Likewise, mappings may be used together with any paging data structure used by the VMs 170A-B to support translation from guest OS 196A-B to host OS 186 addresses (e.g., 32-bit linear address space using a two-level hierarchical paging structure, Physical Address Extension mode, INTEL® Extended Memory 64 Technology mode, etc.).

Figure 2:
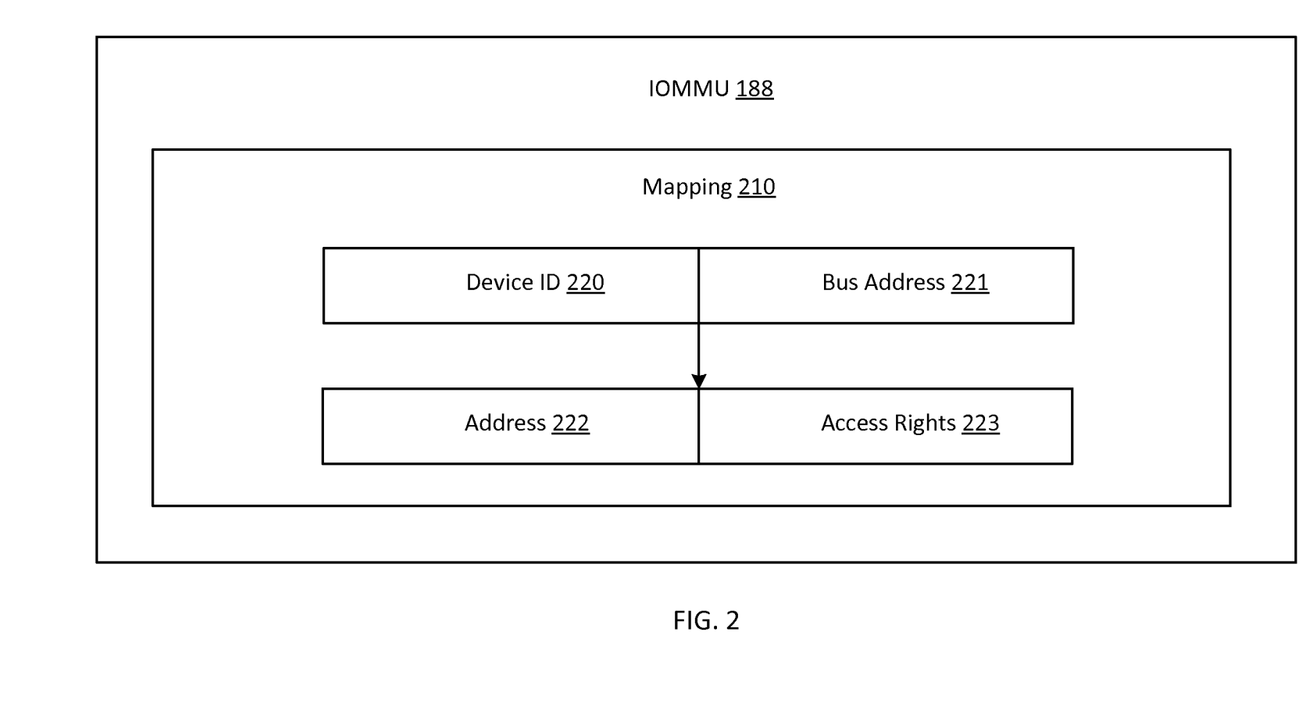
FIG. 2 is a block diagram of an example input-output memory management unit according to an example embodiment of the present disclosure.

FIG. 2 illustrates block diagram of an IOMMU 188 in accordance with an example embodiment of the present disclosure. The IOMMU 188 includes a mapping 210 (e.g., a host mapping). One or more mappings 220 may be maintained by the hypervisor 180, and stored on the IOMMU 188, which map guest OS 196A-B addresses to host OS 186 addresses that are accessible by the hypervisor 180, VMs 170A-B, guest OS 196A-B, host OS 186, and/or host OS 186 resources.

The mapping 210, as stored on the IOMMU 188, maps a device (e.g., device ID 220 and bus address 221) into an address 222 such as a host address (e.g., address of the guest OS 196A-B, address of the host OS 186, etc.) and access rights 223 (e.g., writable (or read-write), write-protected (or read-only), executable (or executable and readable), executable only, etc.). The mapping 210 is programmed by the hypervisor 180. The mapping 210 is used to determine whether an access request by a device can be granted. In an example embodiment, the mapping 210 may include additional information not shown in FIG. 2 including statistics information, background information, dirty identifiers which indicate that modifications to a page must be written back to disk, etc.

Figure 3A:
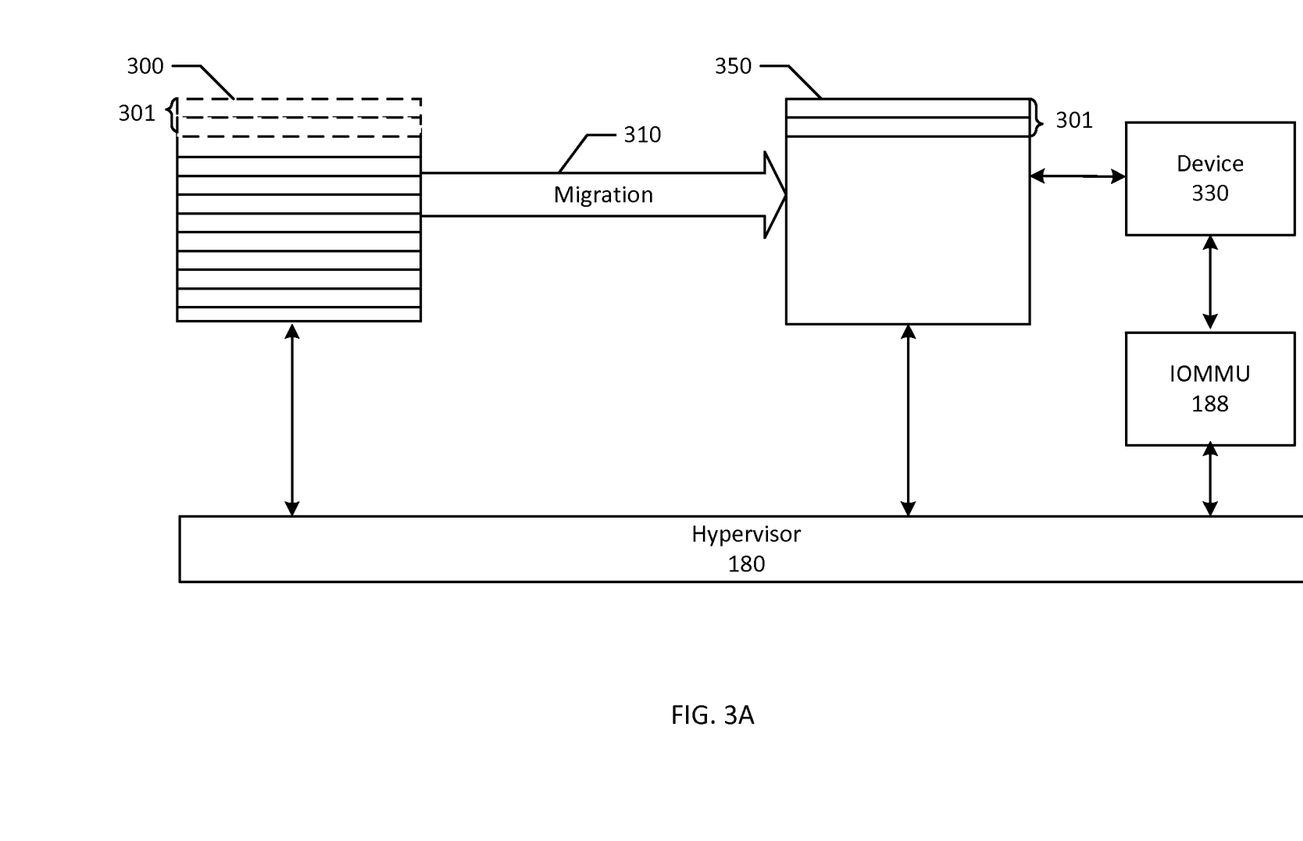
FIG. 3A illustrates a block diagram of a first virtual machine migration from a migration source to a migration destination according to an example embodiment of the present disclosure.
Figure 3B:
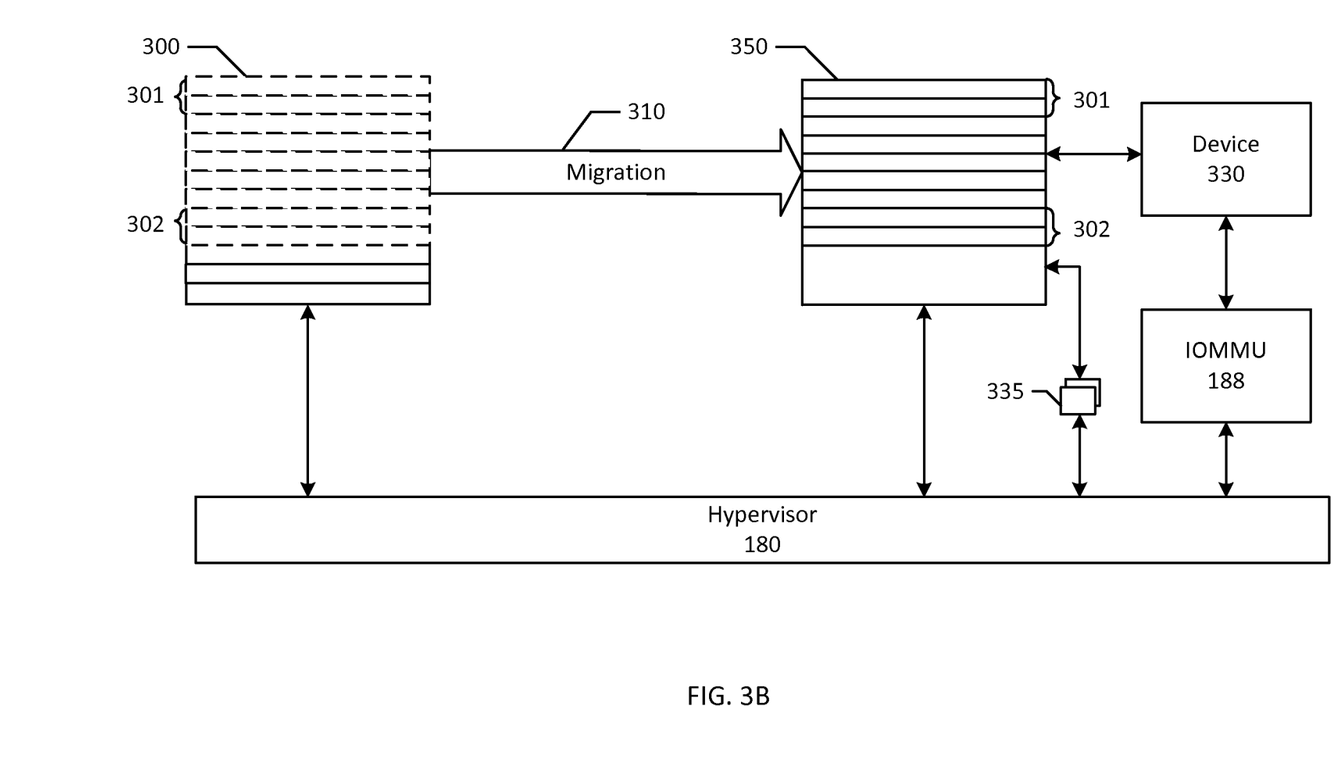
FIG. 3B illustrates a block diagram of a second virtual machine migration from a migration source to a migration destination according to an example embodiment of the present disclosure.

FIGS. 3A and 3B illustrate a block diagram of post-copy virtual machine migration from a migration source to a migration destination according to an example embodiment of the present disclosure. FIG. 3A illustrates a block diagram of a virtual machine migration 310 at a first time from a migration source to a migration destination according to an example embodiment of the present disclosure. The migration source 300 (e.g., a source location of the VM) and migration destination 350 (e.g., a destination location of the VM) are at discrete physical locations in memory (e.g., MD 130A and MD 130C). Each of the migration source 300 and the migration destination 350 has a plurality of pages, which are stored on the migration source 300 and the migration destination 350 respectively. For example, a first plurality of pages 301 of the migration source 300 have just been migrated (as noted by dotted lines at migration source 300), by the hypervisor 180, to the migration destination 350 (as noted by solid lines at migration destination 350), and the rest of the pages present in the migration source 300 have not yet been migrated (as noted by the solid lines at migration source 300).

In an example embodiment, the first plurality of pages 301 copied to the migration destination 350 are referred to as pre-migrated pages or pre-migration, such that all hypervisor 180 copying and storing, after this pre-migration, may be characterized herein as post-copy migration.

The hypervisor 180 stores mappings for the first plurality of pages 301 on an IOMMU 188. The mappings provide a device 330 with access to the migration destination 350 and the location of the associated first plurality of pages 301. By storing mappings on the IOMMU 188, and responsive to updating of mappings by the hypervisor 180, a device receives access to the plurality of pages associated with the mapping.

FIG. 3B illustrates a block diagram of the virtual machine migration 310 at a later second time according to an example embodiment of the present disclosure. As described above in relation to FIG. 3A, the first plurality of pages 301 has already been migrated to the migration destination 350. As illustrated in FIG. 3B, for example, a second plurality of pages 302 of the migration source 300 have just been migrated (as noted by the dotted lines at migration source 300), by the hypervisor 180, to the migration destination 350 (as noted by the solid lines at migration destination 350). The migration source 300 may have remaining pages on the migration source 300 (as noted by the solid lines at migration source 300), which may be migrated at a later time to complete the migration of the virtual machine. In an example embodiment, after the second plurality of pages 302 have been migrated, any pages remaining on the migration source 300 may not be required by the device 330. In an alternative example embodiment, second plurality of pages 302 includes all of the remaining pages on the migration source 300, thus, completing the virtual machine migration 310.

In an example embodiment, the second plurality of pages 302 copied to the migration destination 350 are referred to as post-copy migration or post-copy migrated pages.

The hypervisor 180 stores mappings for the second plurality of pages 302 on an IOMMU 188. In an example embodiment, all changes to the IOMMU 188 (e.g., storage of particular mappings) are done at the migration destination 350. The mappings provide a device 330 with access to the migration destination 350 and the location of the associated second plurality of pages 302. By storing mappings on the IOMMU 188, and responsive to updating of mappings by the hypervisor 180, a device receives access to the plurality of pages associated with the mapping.

With post-copy migration, certain pages (e.g., the pre-migration pages) have already been migrated to the destination 350. However, it is not always true that all pages required for a device 330 have been migrated at the time the device 330 needs to access such pages. Accordingly, at a point in time between the states shown in FIG. 3A and FIG. 3B, the guest (e.g. 196A, 196B) of the virtual machine (e.g. 170A, 170B) attempts to access, using non-caching access, at least one byte of each of the second plurality of pages 302 on the migration destination 350. The second plurality of pages 302 is a plurality of pages that are required for the device 330 but are not yet present in the migration destination. Responsive to the non-caching access attempts of the second plurality of pages 302 that are absent from the migration destination 350, a plurality of page faults 335 (e.g., VCPU access page faults) are generated. Accordingly, the hypervisor 180, in communication with the migration destination 350, detects the plurality of page faults 335, and the hypervisor 180 copies the second plurality of pages 302 from the migration source 300 to the migration destination 350, resulting in the state shown in FIG. 3B. The second plurality of pages 302 is now present in the migration destination 350 (as noted by solid lines). In an example embodiment, this copying and storing is referred to as post-copy migration.

The hypervisor 180 stores mappings for the second plurality of pages 302 on the IOMMU 188. The mappings provide a device 330 with access to the migration destination 350 and the location of the associated second plurality of pages 302. By storing mappings on the IOMMU 188, and responsive to updating of mappings by the hypervisor 180, a device 330 receives access to the plurality of pages associated with the mapping (e.g., including the first plurality of pages 301 and the second plurality of pages 302).

In an example embodiment, the hypervisor 180 provides the IOMMU 188 with a mapping for the first plurality of pages 301 on the migration destination 350, at a first time. Then, the hypervisor 180 provides the IOMMU 188 with a mapping for the second plurality of pages 302 on the migration destination 350, at a second time after the first time. Next, the guest 196A of the virtual machine 170A may attempt to access a third plurality of pages on the migration destination 350 (not shown). The hypervisor 180 detects a plurality of new page faults. The hypervisor 180 copies the third plurality of pages of the guest 196A of the virtual machine 170A, from the migration source 300 to the migration destination 350, and updates the mapping at a third time after the second time. Updating the mapping includes storing a third mapping of the third plurality of pages in the IOMMU 188. Responsive to updating the mapping, the device has access to the third plurality of pages in the IOMMU 188.

In an example embodiment, the hypervisor 180 clears a mapping of fourth plurality of pages (not shown), which are previously stored on the IOMMU 188. When clearing the fourth plurality of pages, the hypervisor 180 deletes the mapping of the fourth plurality of pages in the IOMMU 188. Responsive to clearing the fourth plurality of pages, by deleting the mapping of the fourth plurality of pages in the IOMMU 188, the device no longer has access to the mapping of fourth plurality of pages in the IOMMU 188, and thus cannot access the fourth plurality of pages.

Figure 4:
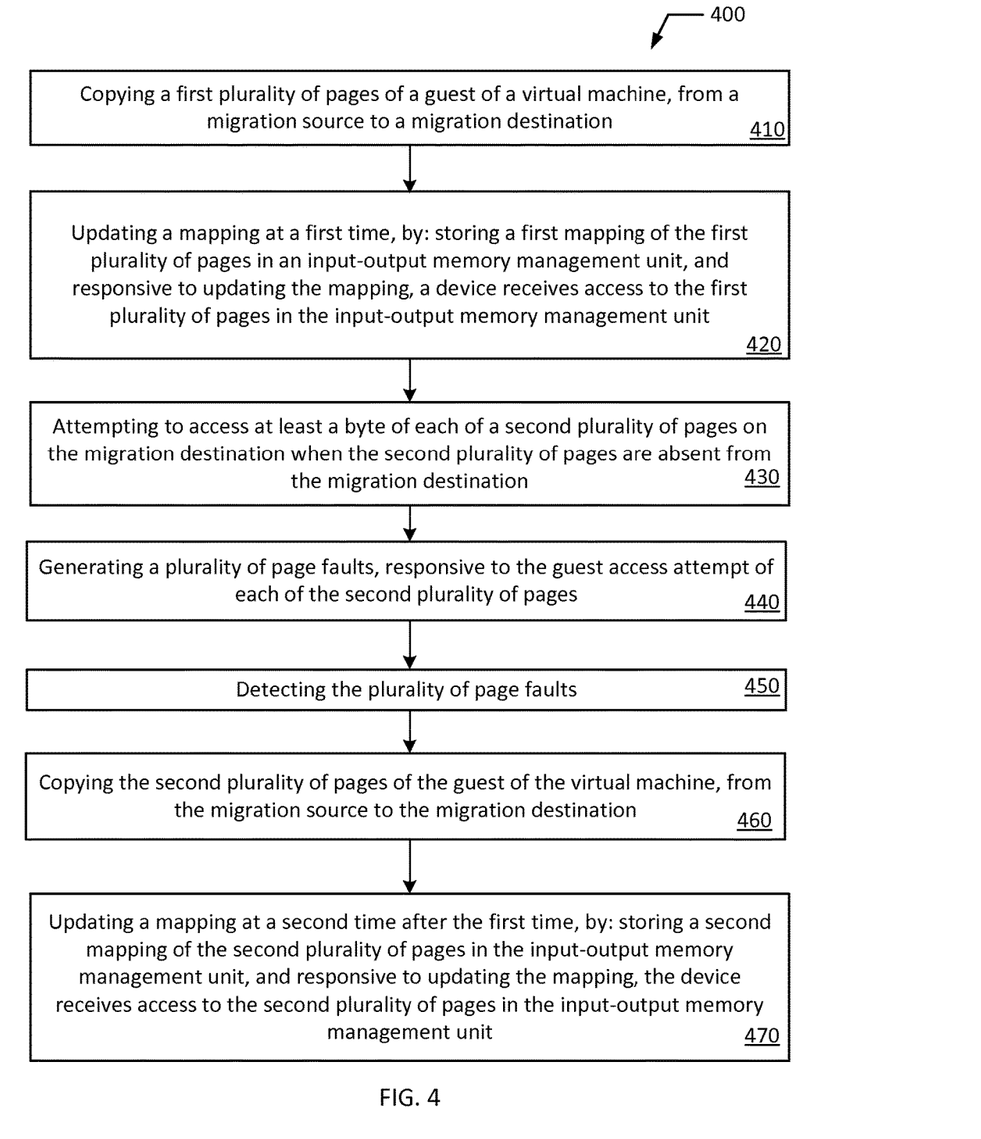
FIG. 4 is a flowchart illustrating an example method for post-copy virtual machine migration according to an example embodiment of the present disclosure.

FIG. 4 illustrates a flowchart of an example method for post-copy virtual machine migration. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example embodiment, the method is performed by a hypervisor 180 and a VM (e.g., 170A).

The example method 400 starts with a hypervisor 180 copying a first plurality of pages of a guest 196A of a virtual machine 170A, from a migration source to a migration destination (block 410). In an example embodiment, block 410 can be omitted, such that the example method 400 starts with block 420. The example method 400 continues by updating a mapping at a first time (block 420). In updating the mapping at the first time, the hypervisor 180 stores a first mapping of the first plurality of pages in an IOMMU 188. Responsive to updating the mapping, a device (e.g., a CPU) receives access to the plurality of pages in the IOMMU 188 (e.g., the pages that have mappings stored on the IOMMU 188).

The guest 196A of the virtual machine 170A then attempts to access at least a byte of each of a second plurality of pages (e.g., required pages for the CPU) on the migration destination (block 430). In an example embodiment, the amount of memory accessed may be any amount that triggers a page fault (e.g., a minimum amount of one byte). In an example embodiment, this access attempt is made using non-caching access. Furthermore, the second plurality of pages are absent from the migration destination (e.g., previously non-migrated pages). A plurality of page faults (block 440) are generated responsive to the guest access attempt of each of the second plurality of pages.

The hypervisor 180 detects the plurality of page faults (block 450). The hypervisor 180 copies the second plurality of pages of the guest 196A of the virtual machine 170A, from the migration source to the migration destination (block 460).

The example method 400 continues by updating a mapping at a second time after the first time (block 470). In updating the mapping at the second time, the hypervisor 180 stores a second mapping of the second plurality of pages in an IOMMU 188. Responsive to updating the mapping, a device (e.g., a CPU) receives access to the plurality of pages in the IOMMU 188 (e.g., the pages that have mappings stored on the IOMMU 188).

Figure 5:
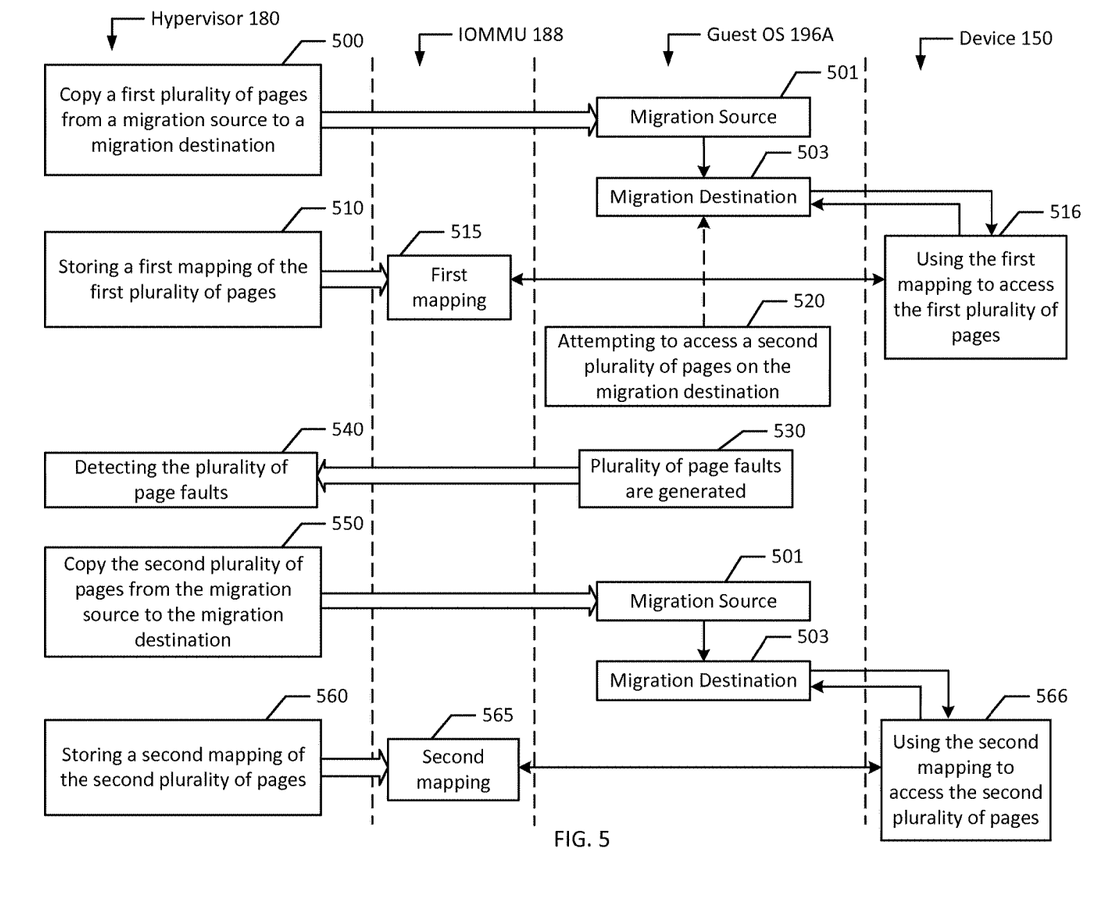
FIG. 5 is a flow diagram illustrating an example method for post-copy virtual machine migration according to an example embodiment of the present disclosure.

FIG. 5 illustrates a flow diagram of an example method for post-copy virtual machine migration. Although the example method is described with reference to the flowchart illustrated in FIG. 5, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (circuitry, dedicated logic, etc.), software, or a combination of both.

In the illustrated example embodiment, a hypervisor 180 is in communication with an IOMMU 188, a guest OS (e.g., 196A) in the virtual machine 170A, and a device 150. In alternate example embodiments, the hypervisor 180, the IOMMU 188, and device 150 are in communication with other virtual machines (e.g., VM 170A-B), applications (e.g., App 198A-D), virtual processors (e.g., VCPU 190A-B), virtual memory devices (e.g., VMD 192A-B), and/or virtual I/O devices (e.g., VI/O 194A-B).

The hypervisor 180 facilitates a migration by copying a first plurality of pages (block 500) from a migration source 501 (e.g., a part of guest memory 195A) to a migration destination 503 (e.g., a different part of guest memory 195B). The guest 196A of the virtual machine 170A, while in the process of migrating, is located at both the migration source 501 and the migration destination 503. In an example embodiment, the first plurality of pages is pre-migrated memory.

The hypervisor 180 then stores a first mapping of the first plurality of pages (block 510). The first mapping 515 that only includes the first plurality of pages (without any yet to be migrated pages) is stored in the IOMMU 188. A device 150 (e.g., a hardware device 150A) has access to the first mapping 515, stored in the IOMMU 188. By having access to the first mapping 515, stored in the IOMMU 188, the device 150 receives access to the first plurality of pages at the migration destination 503. The device 150 uses the first mapping 515 to access the first plurality of pages on the migration destination 503 (block 516). Additionally, the device can access any memory having a corresponding mapping stored in the IOMMU 188.

The guest 196A of the virtual machine 170A then attempts to access a second plurality of pages (e.g., pages that are absent from the migration destination) on the migration destination (block 520). The guest 196A of the virtual machine 170A may be modified to determine each page required by an assigned device, and then attempt to access a byte of each required page. This attempt is made using non-caching access (e.g., at least one byte), so as not to disrupt core processes. Likewise, use of non-caching access avoids pollution of the CPU cache. Each of a plurality of page faults is generated (block 530) responsive to each of the second plurality of pages (e.g., pages that are absent from the migration destination) that were accessed by the guest 196A of the virtual machine 170A.

The hypervisor 180 detects the plurality of page faults (block 540). After the hypervisor 180 detects the page faults, the hypervisor 180 may allow the virtual machine to continue operating without waiting for the yet to be migrated pages. The hypervisor 180 copies the second plurality of pages from the migration source 501 to a migration destination 503 (block 550). Both the migration source 501 and the migration destination 503 are located on the guest 196A of the virtual machine 170A. The hypervisor 180 then stores a second mapping of the second plurality of pages (block 560). The second mapping 565 that only includes the second plurality of pages (without any yet to be migrated pages) is stored in the IOMMU 188. The device 150 (e.g., hardware device 150A) has access to the second mapping 565, stored in the IOMMU 188. By having access to the second mapping 565 stored in the IOMMU 188, the device receives access to the second plurality of pages at the migration destination 503. The device 150 uses the second mapping 565 to access the second plurality of pages on the migration destination 503 (block 566).

In an example embodiment, the device (e.g., hardware device 150A) requires all of the pages, from the second plurality of pages, to function. The device 150 cannot operate until all of the second plurality of pages are on the migration destination 503, and the mapping for the second plurality of pages has been mapped to the IOMMU 188 (block 565). By attempting to access the second plurality of pages on the migration destination (e.g., via the guest 196 of the virtual machine 170A), the hypervisor 180 may be able to migrate the second plurality of pages before the device attempts to access them. At minimum, the device will typically receive access to all pages it requires with minimal delay. Because the guest 196A of the virtual machine 170A attempts to access the second plurality of pages on the migration destination, and the second plurality of pages is subsequently migrated from the migration source to the migration destination, the device interacting with the IOMMU 188 and the guest 196A of the virtual machine 170A never experiences a page absence (e.g., the device will never attempt to access a page that does not exist on the migration destination). This can be characterized as active migration of pages required for assigned devices.

Active migration of required pages (e.g., the second plurality of pages) to the migration destination is preferable because the device does not ever experience a page absence. Moreover, typically, devices do not trigger or tolerate page faults, and, typically, hypervisors are not able to detect which memory is accessed (or access attempts) by a device. Thus, without the presently disclosed method of active migration, the hypervisor cannot expedite migration as required for optimal performance of the device. By advantageously initiating a memory access attempt (e.g., through the guest 196A of the virtual machine 170A), generating page faults, detecting the page faults by the hypervisor 180, and migrating memory corresponding to the detected page faults by a hypervisor 180, the device will never experience a scenario where it attempts to access memory at the migration destination that has not already been migrated by the hypervisor 180 and the pages required by the device are migrated faster, allowing for improved performance of the device.

In a different example embodiment, the device (e.g., hardware device 150A) does not require all of the pages from the second plurality of pages, to function. In this example embodiment, it is not a prerequisite that the second plurality of pages is migrated to the migration destination for the device (e.g., hardware device 150A) to function properly.

Advantageously, once all pages of the migration source are migrated to the migration destination, further access will not trigger additional page faults. Thus, the presently disclosed method is a relatively cheap process.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a method of page migration comprises updating a mapping at a first time, wherein updating the mapping at the first time includes: storing a first mapping of a first plurality of pages of a guest of a virtual machine, which is being migrated from a migration source to a migration destination, in an IOMMU, wherein responsive to updating the mapping, a device receives access to the first plurality of pages in the IOMMU. The method of page migration further comprises detecting a plurality of page faults. The method of page migration further comprises copying a second plurality of pages of the guest of the virtual machine, from the migration source to the migration destination. The method of page migration further comprises updating the mapping at a second time after the first time, wherein updating the mapping at the second time includes: storing a second mapping of the second plurality of pages in the IOMMU, wherein responsive to updating the mapping, the device receives access to the second plurality of pages in the IOMMU.

In accordance with another example aspect of the present disclosure, which may be used in combination with any one or more of the preceding aspects, prior to the first time, the hypervisor copies the first plurality of pages of the guest of the virtual machine, from the migration source to the migration destination.

In accordance with another example aspect of the present disclosure, which may be used in combination with any one or more of the preceding aspects, after updating the mapping at the first time and before detecting the plurality of page faults, the guest of the virtual machine attempts to access at least one byte of each of the second plurality of pages on the migration destination, wherein the second plurality of pages are absent from the migration destination, such that each of the plurality of page faults is generated responsive to the guest access attempt of each of the second plurality of pages.

In accordance with another example aspect of the present disclosure, which may be used in combination with any one or more of the preceding aspects, each access attempt by the guest of the virtual machine is made using non-caching access In accordance with another example aspect of the present disclosure, which may be used in combination with any one or more of the preceding aspects, responsive to the guest of the virtual machine attempting to access a third plurality of pages on the migration destination, the hypervisor detects a plurality of new page faults, copies a third plurality of pages of the guest of the virtual machine, from the migration source to the migration destination, and updates the mapping at a third time after the second time, wherein updating the mapping further comprises: storing a third mapping of the third plurality of pages in the IOMMU, and wherein responsive to updating the mapping, the device has access to the third plurality of pages in the IOMMU.

In accordance with another example aspect of the present disclosure, which may be used in combination with any one or more of the preceding aspects, the hypervisor clears the mapping, wherein clearing the mapping further comprises: deleting a mapping of a fourth plurality of pages in the IOMMU, and wherein responsive to clearing the mapping, the device no longer has access to the fourth plurality of pages in the IOMMU.

In accordance with another example aspect of the present disclosure, which may be used in combination with any one or more of the preceding aspects, the guest of the virtual machine further comprises a guest operating system, such that the device receives access to the guest memory by the IOMMU.

In accordance with another example aspect of the present disclosure, which may be used in combination with any one or more of the preceding aspects, the first mapping of the first plurality of pages and the second mapping of the second plurality of pages further includes an address.

In accordance with another example aspect of the present disclosure, which may be used in combination with any one or more of the preceding aspects, the first plurality of pages include pre-migrated memory.

In accordance with another example aspect of the present disclosure, which may be used in combination with any one or more of the preceding aspects, the second plurality of pages includes a plurality of CPU caches required by the device.

In a second example aspect of the present disclosure, a method of page migration comprises providing a first plurality of pages of a guest of a virtual machine, which is being migrated from a migration source to a migration destination, to a device, wherein a hypervisor: updates a mapping at a first time, wherein updating the mapping at the first time includes: storing a first mapping of the first plurality of pages in an IOMMU, wherein responsive to updating the mapping, a device receives access to the first plurality of pages in the IOMMU. The method of page migration further comprises attempting to access at least one byte of each of a second plurality of pages on the migration destination, wherein the second plurality of pages are absent from the migration destination, such that the plurality of page faults is generated responsive to the guest access attempt of each of the second plurality of pages. The method of page migration further comprises providing the second plurality of pages to the device, wherein the hypervisor: detects the plurality of page faults, copies the second plurality of pages of the guest of the virtual machine, from the migration source to the migration destination, and updates the mapping at a second time after the first time, wherein updating the mapping at the second time includes: storing a second mapping of the second plurality of pages in the IOMMU, wherein responsive to updating the mapping, the device receives access to the second plurality of pages in the IOMMU, and wherein the guest of the virtual machine is configured such that the device will never attempt to access a page that does not exist in the IOMMU.

In accordance with another example aspect of the present disclosure, which may be used in combination with any one or more of the preceding aspects, the method of page migration further comprises attempting to access at least one byte of each of a third plurality of pages on the migration destination, wherein the third plurality of pages are absent from the migration destination, such that the plurality of new page faults is generated responsive to the guest access attempt of each of the third plurality of pages. The method further comprises providing the third plurality of pages to the device, wherein the hypervisor: detects the plurality of new page faults, copies the third plurality of pages of the guest of the virtual machine, from the migration source to the migration destination, and updates the mapping at a third time after the second time, wherein updating the mapping at the third time includes: storing a third mapping of the third plurality of pages in the IOMMU, wherein responsive to updating the mapping, the device receives access to the third plurality of pages in the IOMMU.

In accordance with another example aspect of the present disclosure, which may be used in combination with any one or more of the preceding aspects, the hypervisor clears the mapping, wherein clearing the mapping further comprises: deleting a mapping of a fourth plurality of pages in the IOMMU, and wherein responsive to clearing the mapping, the device no longer has access to the fourth plurality of pages in the IOMMU.

In accordance with another example aspect of the present disclosure, which may be used in combination with any one or more of the preceding aspects, the guest of the virtual machine further comprises a guest operating system, such that the device receives access to the guest memory by the IOMMU.

In accordance with another example aspect of the present disclosure, which may be used in combination with any one or more of the preceding aspects, the first mapping of the first plurality of pages and the second mapping of the second plurality of pages further include an address.

In accordance with another example aspect of the present disclosure, which may be used in combination with any one or more of the preceding aspects, the first plurality of pages include pre-migrated memory.

In accordance with another example aspect of the present disclosure, which may be used in combination with any one or more of the preceding aspects, the second plurality of pages includes a plurality of CPU caches required by the device.

In a third example aspect of the present disclosure, a system of page migration comprises a memory, one or more processors, in communication with the memory, a guest of a virtual machine, executing on the one or more processors, and a hypervisor. The hypervisor, executing on the one or more processors: updates a mapping at a first time, wherein updating the mapping at the first time includes: storing a first mapping of the first plurality of pages of the guest of the virtual machine, which is being migrated from a migration source to a migration destination, in an IOMMU, wherein responsive to updating the mapping, a device receives access to the first plurality of pages in the IOMMU. The guest of the virtual machine attempts to access at least one byte of each of a second plurality of pages on the migration destination, wherein the second plurality of pages are absent from the migration destination, such that a plurality of page faults are generated responsive to the guest access attempt of each of the second plurality of pages. The hypervisor detects the plurality of page faults. The hypervisor copies the second plurality of pages of the guest of the virtual machine, from the migration source to the migration destination. The hypervisor updates the mapping at a second time after the first time, wherein updating the mapping at the second time includes: storing a second mapping of the second plurality of pages in the IOMMU, wherein responsive to updating the mapping, the device receives access to the second plurality of pages in the IOMMU.

In accordance with another example aspect of the present disclosure, which may be used in combination with any one or more of the preceding aspects, the hypervisor clears the mapping, wherein clearing the mapping further comprises deleting a mapping of a fourth plurality of pages in the IOMMU, and wherein responsive to clearing the mapping, the device no longer has access to the fourth plurality of pages in the IOMMU.

In accordance with another example aspect of the present disclosure, which may be used in combination with any one or more of the preceding aspects, the guest of the virtual machine further comprises a guest operating system, such that the device receives access to the guest memory by the IOMMU.

In accordance with another example aspect of the present disclosure, which may be used in combination with any one or more of the preceding aspects, the first mapping of the first plurality of pages and the second mapping of the second plurality of pages further includes an address.

In accordance with another example aspect of the present disclosure, which may be used in combination with any one or more of the preceding aspects, the first plurality of pages include pre-migrated memory.

In accordance with another example aspect of the present disclosure, which may be used in combination with any one or more of the preceding aspects, the second plurality of pages includes a plurality of CPU caches required by the device.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of page migration, the method comprising:
updating a mapping at a first time, wherein updating the mapping at the first time includes:
storing a first mapping of a first plurality of pages of a guest of a virtual machine, which is being migrated from a migration source to a migration destination, in an input-output memory management unit,
wherein each of the migration source and the migration destination has at least one internal hardware device,
wherein responsive to updating the mapping, an external hardware device receives access to the first plurality of pages in the input-output memory management unit, the external hardware device being external to and separate from the guest virtual machine;
detecting a plurality of page faults;
copying a second plurality of pages of the guest of the virtual machine, from the migration source to the migration destination; and
updating the mapping at a second time after the first time, wherein updating the mapping at the second time includes:
storing a second mapping of the second plurality of pages in the input-output memory management unit,
wherein responsive to updating the mapping, the external hardware device receives access to the second plurality of pages in the input-output memory management unit.

2. The method of claim 1, wherein, prior to the first time, the hypervisor copies the first plurality of pages of the guest of the virtual machine, from the migration source to the migration destination.

3. The method of claim 1, wherein, after updating the mapping at the first time and before detecting the plurality of page faults, by the hypervisor, the guest of the virtual machine:
attempts to access at least one byte of each of the second plurality of pages on the migration destination, wherein the second plurality of pages are absent from the migration destination, such that the plurality of page faults are generated responsive to the guest access attempt.

4. The method of claim 3, wherein each access attempt by the guest of the virtual machine is made using non-caching access.

5. The method of claim 1, wherein responsive to the guest of the virtual machine attempting to access a third plurality of pages on the migration destination, the hypervisor:
detects a plurality of new page faults;
copies a third plurality of pages of the guest of the virtual machine, from the migration source to the migration destination; and
updates the mapping at a third time after the second time, wherein updating the mapping further comprises:
storing a third mapping of the third plurality of pages in the input-output memory management unit, and
wherein responsive to updating the mapping, the external hardware device has access to the third plurality of pages in the input-output memory management unit.

6. The method of claim 1, wherein the guest of the virtual machine further comprises a guest operating system, such that the external hardware device receives access to the guest memory by the input-output memory management unit.

7. The method of claim 1, wherein the first mapping of the first plurality of pages and the second mapping of the second plurality of pages includes an address.

8. The method of claim 1, wherein the first plurality of pages include pre-migrated memory.

9. The method of claim 1, wherein the second plurality of pages includes a plurality of CPU caches required by the external hardware device.

10. A method of page migration, the method comprising:
providing a first plurality of pages of a guest of a virtual machine, which is being migrated from a migration source to a migration destination, to an external hardware device, wherein each of the migration source and the migration destination has at least one internal hardware device, and wherein a hypervisor:
updates a mapping at a first time, wherein updating the mapping at the first time includes:
storing a first mapping of the first plurality of pages in an input-output memory management unit,
wherein responsive to updating the mapping, the external hardware device receives access to the first plurality of pages in the input-output memory management unit, the external hardware device being external to and separate from the guest virtual machine;
attempting to access at least one byte of each of a second plurality of pages on the migration destination, wherein the second plurality of pages are absent from the migration destination, such that a plurality of page faults are generated responsive to the guest access attempt; and
providing the second plurality of pages to the external hardware device, wherein the hypervisor:
detects the plurality of page faults,
copies the second plurality of pages of the guest of the virtual machine, from the migration source to the migration destination, and
updates the mapping at a second time after the first time, wherein updating the mapping at the second time includes:
storing a second mapping of the second plurality of pages in the input-output memory management unit,
wherein responsive to updating the mapping, the external hardware device receives access to the second plurality of pages in the input-output memory management unit.

11. The method of claim 10, further comprising:
attempting to access at least one byte of each of a third plurality of pages on the migration destination, wherein the third plurality of pages are absent from the migration destination, such that a plurality of new page faults are generated responsive to the guest access attempt; and
providing the third plurality of pages to the external hardware device, wherein the hypervisor:
detects the plurality of new page faults,
copies the third plurality of pages of the guest of the virtual machine, from the migration source to the migration destination, and
updates the mapping at a third time after the second time, wherein updating the mapping at the third time includes:
storing a third mapping of the third plurality of pages in the input-output memory management unit,
wherein responsive to updating the mapping, the external hardware device receives access to the third plurality of pages in the input-output memory management unit.

12. The method of claim 10, wherein the guest of the virtual machine further comprises a guest operating system, such that the external hardware device receives access to the guest memory by the input-output memory management unit.

13. The method of claim 10, wherein the first mapping of the first plurality of pages and the second mapping of the second plurality of pages includes an address.

14. The method of claim 10, wherein the first plurality of pages include pre-migrated memory.

15. The method of claim 10, wherein the second plurality of pages includes a plurality of CPU caches required by the external hardware device.

16. A system of page retrieval and migration, the system comprising:
 a memory;
 one or more processors, in communication with the memory;
 a guest running on a virtual machine, executing on the one or more processors; and
 a hypervisor, executing on the one or more processors, to:
  update a mapping at a first time, wherein updating the mapping at the first time includes:
   storing a first mapping of a first plurality of pages of the guest of the virtual machine, which is being migrated from a migration source to a migration destination, in an input-output memory management unit,
  wherein each of the migration source and the migration destination has at least one internal hardware device,
  wherein responsive to updating the mapping, an external hardware device receives access to the first plurality of pages in the input-output memory management unit, the external hardware device being external to and separate from the guest virtual machine;
 wherein the guest of the virtual machine:
  attempts to access at least one byte of each of a second plurality of pages on the migration destination, wherein the second plurality of pages are absent from the migration destination, such that a plurality of page faults are generated responsive to the guest access attempt;
 detect the plurality of page faults;
 copy the second plurality of pages of the guest of the virtual machine, from the migration source to the migration destination; and
 update the mapping at a second time after the first time, wherein updating the mapping at the second time includes:
  storing a second mapping of the second plurality of pages in the input-output memory management unit,
  wherein responsive to updating the mapping, the external hardware device receives access to the second plurality of pages in the input-output memory management unit.

17. The system of claim 16, wherein the guest of the virtual machine further comprises a guest operating system, such that the external hardware device receives access to the guest memory by the input-output memory management unit.

18. The system of claim 16, wherein the first mapping of the first plurality of pages and the second mapping of the second plurality of pages includes an address.

19. The system of claim 16, wherein the first plurality of pages include pre-migrated memory.

20. The system of claim 16, wherein the second plurality of pages include a plurality of CPU caches required by the external hardware device.

* * * * *